United States Patent Office 3,770,726
Patented Nov. 6, 1973

3,770,726
PREGNANO[17,16α-d]-1',3'-OXATHIOLANES
Helmut Hofmeister, Henry Laurent, Klaus Prezewowsky, Rudolf Wiechert, and Hermann Steinbeck, Berlin, Germany, assignors to Schering Aktiengesellschaft, Berlin and Bergkamen, Germany
No Drawing. Filed Mar. 16, 1972, Ser. No. 235,425
Int. Cl. C07c 169/34, 173/00
U.S. Cl. 260—239.55 D                 21 Claims

ABSTRACT OF THE DISCLOSURE

Pregnano[17,16α-d]-1',3'-oxathiolanes of the formula

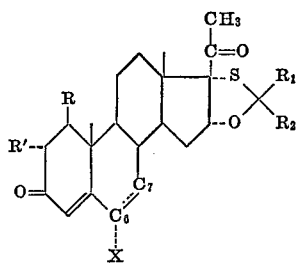

wherein $R_1$ and $R_2$ are, e.g., H, alkyl, cycloalkyl, aryl or heteroaryl, possess long acting progestional activity and are produced by the acid catalyzed condensation of the corresponding 16β-hydroxy-17α-mercapto steroids with a ketone or aldehyde under epimerization of the substituent on carbon atom C–16.

BACKGROUND OF THE INVENTION

This invention relates to novel steroids of the pregnane series bearing a sulfur substituent at the 17-position.

In the pregnane series, it is believed no compounds are known which possess a sulfur substituent on the C–17 carbon atoms.

SUMMARY OF THE INVENTION

The novel compounds of this invention are 16β-hydroxy-17α-mercapto-pregnanes of the General Formula I

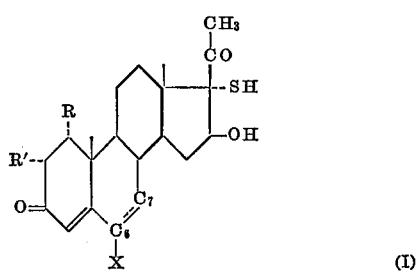

wherein R and R' each are hydrogen atoms or collectively a methylene group, or a second carbon-carbon bond between the C–1 and C–2 carbon atoms, X is hydrogen, halogen or lower-alkyl; and $C_6$–$C_7$ is a single or double bond between the C–6 and C–7 carbon atoms, and 16α,17α-acetals therof, which acetals possess pronounced gestagenic activity.

DETAILED DISCUSSION

The 16α-oxy-17α-mercapto-acetals of this invention are pregnano[17,16α-d]-1',3'-oxathiolanes of the General Formula II

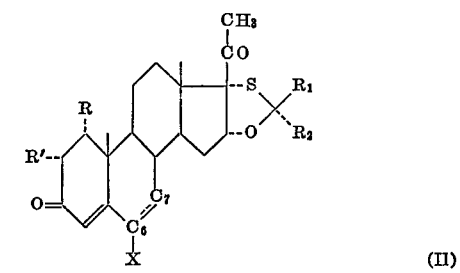

wherein R and R', X and $C_6$–$C_7$ have the values given above and $R_1$ and $R_2$, which can be identical or different, each can be hydrogen, alkyl, cycloalkyl, aryl or heteroaryl or $R_1$ and $R_2$ collectively can be —$(CH_2)_n$—, wherein $n$ is an integer from 2 to 6, e.g., $R_1$=$CH_3$ and $R_2$=$CH_3$ or $C_6H_5$, or vice versa.

Examples of alkyl are straight-chain and branched saturated alkyl groups, preferably lower alkyl of 1–5 carbon atoms, e.g., methyl, ethyl, propyl, isopropyl, butyl, isobutyl, sec.-butyl, tert.-butyl, pentyl, preferably methyl and the corresponding unsaturated alkenyl and alkynyl groups.

Examples of cycloalkyl groups are saturated and mono- and di- unsaturated cycloalkyl groups, preferably those containing 3–8 ring carbon atoms, e.g., cyclopropyl, cyclobutyl, cyclopentyl, cyclohexyl, cycloheptyl, and cyclooctyl. Especially preferred are the cyclopentyl and cyclohexyl.

The halogen atoms are preferably fluorine, chlorine, or bromine atoms.

Examples of aryl are monocyclic aryl, e.g., phenyl.

Examples of heteroaryl are monocyclic heteroaryl, preferably those containing 5 or 6 ring atoms, and preferably a single O, N or S ring atom, e.g., furyl, furfuryl, pyrrolyl, pyranyl, pyridyl, preferably thienyl or thenyl.

Examples of bridging —$(CH_2)_n$— groups are tetramethylene, pentamethylene, and hexamethylene.

It will be apparent to those skilled in the art that when $R_1$ and/or $R_2$ are alkyl, cycloalkyl, aryl or heteroaryl, these groups can be either unsubstituted or substituted by simple substituents without affecting the operability of the method for their production or destroying the gastagenic activity of the compounds of Formula II.

Thus, when $R_1$ or $R_2$ is alkyl, the alkyl group can be substituted with one, two or more, preferably one of halogen as defined above, hydroxy, amino, nitro, and alkoxy of 1–5 carbon atoms or cycloakyl, aryl or heteroaryl as defined above.

Similarly, cycloalkyl can be substituted by one or more of alkyl or halo as defined above and/or contain a hetero atom as a ring atom. Similarly, the $(CH_2)_n$-bridge can contain a hetero atom as bridging atom. Examples of hetero atoms contained in cycloalkyl or bridging group are e.g., oxygen, nitrogen or sulfur.

Aryl can be substituted in one or more of the ortho-, meta- and para-positions, e.g., by one or more of hydroxy, amino, nitro, alkyl and alkoxy and halogen as defined above.

Similarly, the heteroaryl group can be substituted by one or more of hydroxy, amino, nitro or alkyl, alkoxy or as defined hereinabove.

The novel 16α-oxy-17α-mercapto acetals of this invention exhibit therapeutically valuable properties. In particular, they are distinguished, upon oral as well as subcutaneous administration, by their gestagenic effect, wherein they do not display a central inhibitory effect in normal dosage ranges. Furthermore, the novel oxythio acetals exhibit a depot effect which is superior to the analogous compounds having an oxygen function on the carbon C–17. As evidenced by the data shown in the table below for (2'-R)-2'-methyl-2'-phenyl-4-pregneno [17,16α-d]-1',3'-oxathiolane-3,20-dione (2), compared to the corresponding dioxolane compound, i.e., the known 16α,17α-dihydroxyprogesterone acetophenide (1), the oxythio acetals of the present invention exhibit greater and longer acting gestagenic activity.

| Days after injection | McPhail index of— | |
|---|---|---|
| | Compound 1 | Compound 2 |
| 3 | 1.3 | 1.2 |
| 7 | 2.9 | 3.5 |
| 10 | 2.5 | 2.9 |

The McPhail values were obtained in the protracted Clauberg test on infantile rabbins after subcutaneous administration of 3 mg. of steroid per animal.

The 16α-oxy-17α-mercapto acetals of this invention are useful for the production of drugs and can be employed, optionally in combination with other steroidal hormones, for the treatment of gynecological disturbances, including oligomenorrhea and hypermenorrhea, anovulatory cycles, premenstrual complaints, dysmenorrhea, endometriosis and dysfunctional bleeding. They can be used, optionally in combination with estrogens, to prevent conception.

As will be apparent, the dosage is dependent on the graveness of the disease and the intensity of the treatment. In general, between 5 and 100 mg. of a 16α-oxy-17α-mercapto acetal of this invention is administered daily. Strong fluctuations in menstruation can be regulated, for example, by the cycle-adapted treatment with daily doses of 10 mg. When using the compound of this invention as a contraceptive, optionally together with a conventional amount of a known estrogen, the dosage is 0.1–5 mg. per day.

The pharmaceutical compositions of this invention are prepared in the usual manner, by converting the 16α-oxy-17α-mercapto-acetals, together with the vehicles, diluents, flavor-ameliorating agents customary in galenic pharmacy, into the desired forms of application, such as tablets, dragees, capsules, oral or injectable solutions, implant pellets, etc. The concentration of the acetal in the thus-formulated drugs is dependent on the form of application. Accordingly, a tablet preferably contains 0.1–10 mg. Solutions for parenteral administration generally contain 1–20 mg./ml. of solution.

The pregnano [17,16α-d]-1',3'-oxathiolanes of this invention, e.g., of the General Formula II, are prepared by condensing a 16β-hydroxy - 17α - mercapto-pregnane of Formula I with a carbonyl compound, the substituent on the carbon C–16 being epimerized in the reaction. This course of the reaction could not be predicted and was surprising.

Accordingly, in its process aspect, this invention relates to a process for the preparation of pregnano-[17,16α-d]-1',3'-oxathiolanes by the condensation, in the presence of an acid catalyst, of 16β-hydroxy-17α-mercapto-pregnanes of Formula I with an aldehyde or ketone, e.g., carbonyl compounds of the General Formula III

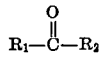

wherein $R_1$ and $R_2$ have the values given above.

The operability of the process of this invention does not depend upon the values of R, R', and $C_6$-----$C_7$. Thus, starting compounds for the process can be employed wherein R, R' and $C_6$-----$C_7$ have the values desired in the final product or the desired groups can be introduced subsequently into the molecule after the condensation.

Suitable catalysts for the condensation are strong acids, especially Lewis acids, e.g., concentrated hydrochloric acid, sulfuric acid, p-toluenesulfonic acid, perchloric acid, boron trifluoride etherate, boron trichloride, and similar compounds. In general, small amounts of these catalytically active acids are sufficient to enable the reaction to proceed in the desired manner. However, even larger amounts of catalyst do not entail any disturbance of the reaction.

Examples of carbonyl compounds employed in the condensation with 16,17-mercaptohydrin of the General Formula I are formaldehyde, acetaldehyde and other alkanals, acetone, methyl ethyl ketone, methyl butyl ketone, ethyl butyl ketone and other alkanones, methyl benzyl ketone and other alkyl aryl ketones, cyclopropanone, cyclobutanone, cyclopentanone, cyclohexanone, cycloheptanone and other cycloalkanones, benzaldehyde, halobenzaldehydes, e.g., p-chlorobenzaldehyde, alkoxybenzaldehydes, e.g. o-anisaldehyde, hydroxybenzaldehydes, e.g. salicylaldehyde, lower alkylbenzaldehydes, e.g. m-tolualdehyde and p-ethylbenzaldehyde, nitrobenzaldehydes and aminobenzaldehydes and other aryl aldehydes, phenylacetaldehyde, α-phenylpropionaldehyde, β-phenylpropionaldehyde, γ-phenylbutyraldehyde and other aralkanals, picolinaldehydes, furfurol, thiophenaldehydes, acetophenone, propiophenone, butyrophenone, valerophenone, p-fluoroacetophenone, p-chloroacetophenone, p-hydroxyacetophenone, alkoxyphenyl alkyl ketones with lower alkoxy and alkyl groups, for example, p-anisyl methyl ketone, and other aryl alkyl ketones, 1-phenyl-3-butanone, 1-phenyl-4-pentanone and other aryl substituted alkanone, 2-benzoylfuran, 2-acetylthiophene and pyridinaldehydes.

The carbonyl compound can serve both as the reactant and as the reaction solvent. However, the reaction can be conducted also in the presence of an inert additional solvent, diluent or solubilizer, e.g., dioxane, tetrahydrofuran, glyme, diglyme and chlorinated hydrocarbons. The starting steroid can, in certain cases, also be employed in suspension.

The condensation usually takes place under very gentle reaction conditions, e.g., −10° C. to 35° C. Normally, room temperature or slightly higher and a reaction time of about 1–8 hours is employed. However, also higher reaction temperatures and/or prolonged reaction periods can be employed. When the substituents $R_1$ and $R_2$ in the carbonyl compounds employed for the condensation reaction are different, epimeric mixtures are produced, the components of which can be separated by means of chromatography and/or recrystallization.

The introduction of the double bond or bonds into the 1- and/or 6-position, as well as the 1,2-methylenation, can be conducted in accordance with methods known to a person skilled in the art.

Examples which can be set forth are as follows:

(a) Introduction of the Δ¹-double bond: Reaction with chloranil or 2,3-dichloro-5,6-dicyano-1,4-benzoquinone, or dehydrogenation with a selenium compound, e.g., selenium dioxide or selenous acid or microbiological dehydrogenation means;

(b) Introduction of a Δ⁶-double bond: Reaction with chloranil or 2,3-dichloro-5,6-dicyano-1,4-benzoquinone, or bromination with N-bromosuccinimide and subsequently elimination of hydrogen bromide with a lithium halide and alkali metal carbonate;

(c) Simultaneous introduction of Δ¹- and Δ⁶-double bonds: Reaction with chloranil, or bromination with bromine to the 2,6-dibromo derivative with subsequent debromination with lithium halide and alkali metal carbonate;

(d) 1,2-methylenation: Reaction with dimethyl sulfoxonium methylide or reaction with diazomethane with subsequent thermal or catalytic dissociation of the thus-formed 1',2'-pyrazolino steroids.

The starting 16β-hydroxy-17α-mercapto compounds of Formula I employed in accordance with this process are novel. These compounds can be prepared by conventional methods, e.g., reaction of a 16β,17-epoxy steroid with hydrogen sulfide analogously to the process of Preparation A and/or Preparation B and/or Preparation C. The introduction of the double bond or bonds into the 1- and/or 6-position, and the methylenation at the 1-position can be effected in accordance with methods familiar to those skilled in the art, e.g., according to the above-described processes. The steroids employed as the starting materials can also contain any other groups inert with respect to the reagent. The compounds are frequently obtained in a foamy or oily form and are generally used in this condition as crude products for the production of the compounds of General Formula II.

Other examples of acetals of Formula II, in addition to those of the examples hereinafter are those of formaldehyde, acetaldehyde, methyl ethyl ketone, methyl butyl ketone, ethyl butyl ketone, methyl benzyl ketone, cyclopropanone, cyclobutanone, cyclopentanone, cyclohexanone, cycloheptanone, benzaldehyde, p-chlorobenzaldehyde, o-anisaldehyde, salicylaldehyde, m-tolualdehyde, p-ethylbenzaldehyde, o-nitrobenzaldehyde, p-aminobenzaldehyde, phenylacetaldehyde, a-phenylpropionaldehyde, β-phenylpropionaldehyde, α-phenylbutyraldehyde, furfurol, propiophenone, butyrophenone, valerophenone, p - fluoroacetophenone, p - chloroacetophenone, p-hydroxyacetophenone, p-anisyl methyl ketone, 1-phenyl-3-butanone, 1-phenyl-4-pentanone, 2-benzoylfuran and 2-acetylthiophene.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

PREPARATION A

Two grams of 16β,17-epoxy-17α-pregn-4-ene-3,20-dione is mixed, in 100 ml. of glacial acetic acid, with 1.2 g. of p-toluenesulfonic acid and saturated with hydrogen sulfide. The solution is allowed to stand at room temperature for 17 hours and then stirred into ice water. The precipitate is vacuum-filtered, taken up in methylene chloride, and dried. Chromatography on silica gel with 3–6% acetone-methylene chloride results in 500 mg. of 16β-hydroxy-17α-mercapto-4-pregnene-3,20-dione, M.P. 156/158–159° C. (acetone-hexane).

UV: $\epsilon_{241}$ 15,500 (methanol)

PREPARATION B 50 g. of 17α-bromo-16β-hydroxy-4-pregnene-3,20-dione is agitated in 800 ml. of tert.-butanol with 80 g. of chloranil under a nitrogen atmosphere at 100° C. for 20 hours. Then, the reaction mixture is filtered off from the undissolved substance, the filtrate is concentrated, and the crude product is chromatographed on silica gel with 19–23% aceto-pentane. After recrystallization from acetone-hexane, 21.3 g. of 17α-bromo-16β-hydroxy-4,6-pregnadiene-3,20-dione is obtained, M.P. 141/142–144° C.

UV: $\epsilon_{283}$ 25,600 (methanol)

A solution of 18.4 g. of m-chloroperbenzoic acid in 94 ml. of tert.-butanol and 30 ml. of ethylene chloride is added to 16.1 g. of 17α-bromo-16β-hydroxy-4,6-pregnadiene-3,20-dione in 150 ml. of ethylene chloride. The reaction solution is allowed to stand for 3 days at 40° C.; then, the solution is concentrated, the residue is taken up in methylene chloride, and washed successessively with a sodium thiosulfate solution and water. After chromatography on silica gel with 24–27% acetone-pentane and recrystallization from acetone-hexane, 4.5 g. of 17α-bromo-16β-hydroxy-6α,7α-epoxy - 4 - pregnene - 3,20 - dione is obtained, M.P. 164–169° C.

UV: $\epsilon_{239}$ 14,000 (methanol)

36 g. of 17α-bromo - 16β - hydroxy - 6α,7α - epoxy-4-pregnene-3,20-dione is allowed to stand for 3 days in glacial acetic acid saturated with hydrogen chloride. Then, the reaction mixture is precipitated in ice water, the precipitate is vacuum-filtered, taken up in methylene chloride, and dried over sodium sulfate. The product is chromatographed on silica gel with 10–30% acetone-hexane. After recrystallization from acetone-hexane, 8.2 g. of 6-chloro-17α-bromo-16β-hydroxy - 4, 6-pregnadiene - 3,20-dione, M.P. 155–157° C. (decomposition).

UV: $\epsilon_{285}$ 22,000 (methanol)

8 g. of 6-chloro-17α-bromo-16β-hydroxy - 4,6 - pregnadiene-3,20-dione is agitated at room temperature in 80 ml. of acetone and 160 ml. of ethanol with 8 g. of potassium carbonate. After 12 hours, the reaction product is precipitated in ice water. The precipitate is vacuum-filtered, taken up in methylene chloride, and dried over sodium sulfate. After recrystallization from acetone-hexane, 5.2 g. of 6-chloro-16β,17-epoxy-17α-pregna - 4,6 - diene-3,20-dione is obtained, M.P. 154–155° C.

UV: $\epsilon_{285}$ 20,900 (methanol)

6.2 g. of 6-chloro-16β,17-epoxy-17α-pregna-4,6-diene-3,20-dione is mixed in 300 ml. of glacial acetic acid with 2 g. of p-toluenesulfonic acid. The solution is then saturated with hydrogen sulfide and allowed to stand for 12 hours at room temperature. Then, the reaction product is stirred into ice water; the precipitate is vacuum-filtered, taken up in ether, and dried over sodium sulfate. By chromatography on silica gel with 14–15% acetone-pentane, 1.8 g. of 6-chloro-16β-hydroxy-17α-mercapto-4,6-pregnadiene-3,20-dione is obtained as a foam.

UV: $\epsilon_{284}$ 20,800 (methanol)

PREPARATION C 5 grams of 6α-methyl-4,16-pregnadiene-3,20-dione is dissolved in 140 ml. tert.-butanol and 40 ml. water and mixed with 0.1 ml. of 70% strength perchloric acid. After cooling the mixture to 0° C. 5 g. of N-bromosuccinimide is added. Then, the reaction mixture is slowly warmed up to room temperature and allowed to stand at room temperature for 5 hours. The reaction mixture is precipitated in ice water containing sodium hydrogensulfite. The precipitate is filtered off, taken up in methylene chloride, washed with water and dried. After chromatography on silica gel with 3–7% acetone-methylene chloride, 3.4 g. of 17-bromo-16β-hydroxy - 6α - methyl-4-pregnene-3,20-dione is obtained as a foam.

UV: $\epsilon_{241}$ 16,100 (methanol)

3.2 g. of 17-bromo-16β-hydroxy-6α-methyl-4-pregnene-3,20-dione is agitated at room temperature in 60 ml. of ethanol and 30 ml. of acetone with 3 g. of potassium carbonate. After 4 hours, the reaction product is precipitated in ice water, taken up in methylene chloride, washed with water and dried. 2.3 g. of 16β,17-epoxy-6α-methyl-17α-pregn-4-ene-3,20-dione is obtained as an oil.

UV: $\epsilon_{241}$ 16,300 (methanol)

2.1 g. of 16β,17-epoxy-6α-methyl-17α-pregn-4-ene-3,20-dione is mixed in 100 ml. of glaced acetic acid with 1.2 g. of p-toluenesulfonic acid. The solution is then saturated with hydrogen sulfide and allowed to stand for 6 hours at room temperature. Then, the reaction product is stirred into ice water; the precipitate is vacuum-filtered, taken up in ether, and dried. As crude product 1.2 g. of 16β-hydroxy-17α-mercapto-6α-methyl-4 - pregnene - 3,20-dione is obtained.

Following the procedure of Preparations A, B and C,

16β-hydroxy-17α-mercapto-4,6-pregnadiene-3,20-dione,
16β-hydroxy-17α-mercapto-1,4,6-pregnadiene-3,20-dione,
16β-hydroxy-17α-mercapto-1α,2α-methylene-4,6-pregnadiene-3,20-dione,
6-chloro-16β-hydroxy-17α-mercapto-1,4,6-pregnadiene-3,20-dione and
6-chloro-16β-hydroxy-17α-mercapto-1α,2α-methylene-4,6-pregnadiene-3,20-dione and produced from 16β,17-epoxy-17α-pregna-4,6-diene-3,20-dione,
16β,17-epoxy-17α-pregna-1,4,6-triene-3,20-dione,
1α,2α-methylene-16β,17-epoxy-17α-pregna-4,6-diene-3,20-dione,
6-chloro-16β,17-epoxy-17α-pregna-1,4,6-triene-3,20-dione and
1α,2α-methylene-6-chloro-16β,17-epoxy-17α-pregna-4,6-diene-3,20-dione, respectively.

Example 1

1 ml. of 70% strength perchloric acid is added to 1.6 g. of 16β-hydroxy-17α-mercapto - 4 - pregnene-3,20-dione in 50 ml. of acetone. The reaction mixture is agitated at room temperature for 4 hours. Then, the solution is introduced into ice water, the precipitate is vacuum-filtered, washed with water, and the reaction product is taken up in methylene chloride and dried. By chromatography on silica gel with 10–17% acetone-pentane and recrystallization from acetone-hexane, 330 mg. of 2′,2′-dimethyl-4-pregneno[17,16α-d]-1′3′-oxathiolane - 3,20 - dione is obtained, M.P. 194–195° C.

UV: $\epsilon_{240}$ 16,800 (methanol)

Example 2

10 g. of 16β-hydroxy-17α-mercapto - 4 - pregnene-3,20-dione is agitated in 100 ml. of acetophenone with 2 ml. of 70% perchloric acid at room temperature and under nitrogen. After the reaction is terminated, the solution is mixed with 3 ml. of pyridine, diluted with ether, and washed neutral with water. After steam distillation, the reaction product is taken up in methylene chloride and dried over sodium sulfate. After chromatography on silica gel with ethyl acetate-hexane and repeated recrystallization from acetone-hexane, 534 mg. of (2′R)-2′-methyl-2′-phenyl-4-pregneno[17,16α-d]-1′,3′ - oxathiolane - 3,20-dione is produced, M.P. 205–206° C.

UV: $\epsilon_{240}$ 16,500 (methanol)

Example 3

2.0 g. of 16β-hydroxy-17α-mercapto-4,6-pregnadiene-3,20-dione is dissolved in 60 ml. of acetone and mixed with 1 ml. of 70% strength sulfuric acid. The reaction mixture is agitated for 5 hours at room temperature, then poured into ice water, and the precipitate is vacuum-filtered, washed with water, and the reaction product is taken up in methylene chloride and dried. After chromatography on silica gel with 10–11% acetone-pentane and recrystallization from acetone-hexane, 250 mg. of 2′,2′-dimethyl-4,6-pregnadieno[17,16α]-1′,3′ - oxathiolane - 3,20-dione is obtained, M.P. 192–194° C.

UV: $\epsilon_{282}$ 27,000 (methanol)

Example 4

4.5 g. of 16β-hydroxy-17α-mercapto1,4,6-pregnatriene-3,20-dione is dissolved in 140 ml. of acetone and mixed with 500 mg. of p-toluenesulfonic acid. The reaction mixture is agitated for 6 hours at 40° C. Then, the solution is introduced into ice water, the precipitate is vacuum-filtered, washed with water, 2 N sodium hydroxide solution and repeatedly once more with water, and dried. After chromatography on silica gel with 9–11% acetone-hexane and recrystallization from acetone-hexane, 1.8 g. of 2′,2′ - dimethyl-1,4,6-pregnatrieno[17,16α-d]-1′,4′-oxathiolane-3,20-dione is obtained, M.P. 200–202° C.

UV: $\epsilon_{223}$ 12,250; $\epsilon_{298}$ 11,900 (methanol)

Example 5

3 g. of 16β - hydroxy - 17α-mercapto-1α-2α-methylene-4,6-pregnadiene-3,20-dione is dissolved in 80 ml. of acetone and mixed with 1 ml. of 70% strength perchloric acid. The reaction mixture is agitated for 4 hours at room temperature. Then, the solution is introduced into ice water and the reaction product is extracted with ether. By chromatography on silica gel with 8–10% actone-hexane and recrystallization from acetone-hexane, 335 mg. of 2′,2′ - dimethyl - 1α,2α - methylene - 4,6-pregnadieno[17,16α-d]-1′,3′-oxathiolane-3,20-dione is obtained, M.P. 235.5–237° C.

UV: $\epsilon_{282}$ 19,150 (methanol)

Example 6

2 g. of 6 - chloro - 16β - hydroxy - 17α-mercapto-1,4,6-pregnatriene-3,20-dione is dissolved in 400 ml. of acetone and mixed with 7 ml. of 70% strength perchloric acid. The reaction mixture is agitated for 16 hours at room temperature. Then, the solution is introduced into ice water, extracted with methylene chloride, and dried over sodium sulfate. After chromatography on silica gel with 12–14% acetone-hexane and recrystallization, 680 mg. of 6-chloro-2′,2′-dimethyl - 1,4,6 - pregnatrieno[17,16α-d]-1′,3′-oxathiolane-3,20-dione is obtained, M.P. 190–192° C.

UV: $\epsilon_{221}$ 11,900; $\epsilon_{298}$ 11,300 (methanol)

Example 7

1.5 g. of 6-chloro-16β-hydroxy-17α-mercapto-1α,2α-methylene-4,6-pregnadiene-3,20-dione is dissolved in 250 ml. of acetone and mixed with 5 ml. of 70% strength perchloric acid. After allowing the reaction mixture to stand for 8 hours at room temperature, the reaction solution is neutralized with sodium bicarbonate and then concentrated. The crude product is taken up in methylene chloride and dried over sodium sulfate. After chromatography on silica gel with 8–12% acetone-hexane and recrystallization from acetone-hexane, 320 mg. of 6-chloro-2′,2′-dimethyl - 1α,2α-methylene-4,6-pregnadieno[17,16α-d]1′,3′-oxathiolane-3,20-dione is obtained, M.P. 204–207° C.

UV: $\epsilon_{282}$ 17,100 (methanol)

Example 8

.3 g. of 6-chloro-16β-hydroxy-17α-mercapto-4,6-pregnadiene-3,20-dione is allowed to stand at room temperature for 2 days with 10 ml. of 70% strength perchloric acid in 500 ml. of acetone. The reaction solution is concentrated, after neutralization with sodium bicarbonate, the crude product is taken up in methylene chloride, dried over sodium sulfate, and chromatographed on silica gel with 10–13.4% of acetone-hexane. After recrystallization from acetone-diisopropyl ether-hexane, 850 mg. of 6-chloro - 2′,2′ - dimethyl - 4,6 - pregnadieno[17,16α-d]-1′,3′-oxathiolane-3,20-dione is obtained, M.P. 182–183° C.

UV: $\epsilon_{284}$ 20,700 (methanol)

Example 9

5 g. of 2′,2′-dimethyl-4-pregneno[17,16α-d]-1′,3′-oxathiolane-3,20-dione is refluxed in 150 ml. of tert.-butanol with 8.5 g. of chloranil and 500 mg. of p-toluenesulfonic acid for 17 hours under a nitrogen atmosphere. Then, the solution, after filtering off the chloranil, is evaporated to dryness under vacuum. The residue is dissolved in ether and repeatedly washed in succession with water, 2 N sodium hydroxide solution, and water. After chromatography on silica gel with 10–11% acetone-pentane and recrystallization from acetone-hexane, 600 mg. of 2′,2′- dimethyl-4,6-pregnadieno[17,16α-d]-1',3' - oxathiolane-3,20-dione is produced, M.P. 193-294° C.

UV: ε₂₈₂ 27,000 (methanol)

Example 10

12 g. of 2',2'-dimethyl - 4 - pregneno[17,16α-d]-1',3'-oxathiolane-3,20-dione is reacted, in 420 ml. of ether with a solution of 9.6 g. of bromine in 70 ml. of glacial acetic acid under the addition of 0.6 ml. of a saturated solution of hydrobromic acid in glacial acetic acid to produce the 2,6-dibromo - 2',2'-dimethyl-4-pregneno[17,16α-d]-1',3'-oxathiolane-3,20-dione, which is isolated via precipitation in ice water. For debromination, this compound is agitated as the crude product with 8 g. of lithium carbonate and 8 g. of lithium bromide in 200 ml. of dimethylformamide under nitrogen at 120° C. for 3 hours. The reaction product is precipitated in ice water. The precipitate is vacuum-filtered and dried. After chromatography on silica gel with 9-11% acetone-hexane and recrystallization from acetone-hexane, 5.3 g. of 2',2' - dimethyl - 1,4,6 - pregnatrieno-[17,16α-d]-1',3'-oxathiolane-3,20-dione is obtained, M.P. 201-202° C.

UV: ε₂₂₂ 12,200; ε₂₅₅ 10,200; ε₂₉₈ 11,900 (methanol)

Example 11

320 mg. of pulverized sodium hydroxide is added to 1.7 g. of trimethyl sulfoxonium iodide in 40 ml. of dimethyl sulfoxide. After 30 minutes, under agitation and introduction of nitrogen at room temperature, 2 g. of 2',2' - dimethyl - 1,4,6 - pregnatrieno[17,16α-d]-1',3'-oxathiolane-3,20-dione is added thereto. The reaction solution is stirred, after 20 hours, into acetic ice water, and the reaction product is extracted with ether. By chromatography on silica gel with 6-12% acetone-hexane and recrystallization from acetone-hexane, 530 mg. of 2',2'-dimethyl - 1α,2α - methylene - 4,6-pregnadieno[17,16α-d]-1',3'--oxathiolane-3,20-dione is isolated, M.P. 236-237° C.

UV: ε₂₈₂ 19,100 (methanol)

Example 12

1.2 g. of 6-chloro - 2',2' - dimethyl - 4,6 - pregnadieno-[17,16α-d] - 1',3' - oxathiolane - 3,20 - dione is refluxed with 1.5 g. of 2,3-dichloro - 5,6 - dicyano - 1,4 - benzoquinone in 50 ml. of absolute benzene for 24 hours. Then, the reaction mixture is separated from the insoluble matter, and the crude product is chromatographed on silica gel with 12-15% acetone-hexane. After recrystallization from acetone-hexane, 430 mg. of 6-chloro - 2',2' - dimethyl-1,4,6 - pregnatrieno[17,16α-d] - 1',3' - oxathiolane-3,20-dione is obtained, M.P. 191-193° C.

UV: ε₂₂₁ 11,900; ε₂₅₅ 10,100; ε₂₉₈ 11,300 (methanol)

Example 13

250 mg. of trimethyl sulfoxonium iodide in 8 ml. of dimethyl sulfoxide is agitated for 20 minutes with 48 mg. of pulverized sodium hydroxide under a nitrogen atmosphere. Then, 400 mg. of 6-chloro - 2',2' - dimethyl-1,4,6 - pregnatrieno[17,16α-d] - 1',3' - oxathiolane-3,20-dione is added thereto. After 6 hours, the reaction product is precipitated in acetic ice water, the precipitate is vacuum-filtered, taken up in methylene chloride, and dried over sodium sulfate. After chromatography on silica gel with 8-12% acetone-hexane and recrystallization from acetonehexane, 80 mg. of 6 - chloro-2',2'-dimethyl - 1α,2α - methylene - 4,6 - pregnadieno[17,16α-d] - 1',3' - oxathiolane - 3,20 - dione is obtained, M.P. 203-206° C.

UV: ε₂₈₂ 17,100 (methanol)

Example 14

0.5 ml. of 70% strength perchloric acid is added to 1.2 g. of 16β-hydroxy - 17α - mercapto - 6α - methyl-4-pregnene - 3,20 - dione in 20 ml. of acetone. The reaction mixture is agitated at room temperature for 4 hours.

Then, the solution is introduced into ice water, the precipitate is taken up in methylene chloride and dried over sodium sulfate. After chromatography on silica gel with 15-18% acetone-hexane, 115 mg. of 2',2',6-trimethyl-4-pregneno[17,16α-d] - 1',3' - oxathiolane - 3,20 - dione is obtained as a foam.

UV: ε₂₄₁ 16,200 (methanol)

The proceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. 16β-hydroxy-17α-mercapto-pregnane of the formula

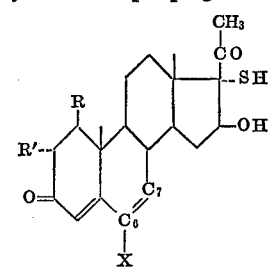

wherein R and R' each are hydrogen or collectively methylene or a further carbon-carbon bond between the C–1 and C–2 carbon atoms; X is hydrogen, halogen or lower-alkyl; and C₆----C₇ is a single or double bond between the C–6 and C–7 carbon atoms.

2. A compound of claim 1 wherein X is H or Cl.

3. A compound of claim 2 wherein R and R' collectively are a second carbon-carbon bond between the C–1 and C–2 carbon atoms.

4. A compound of claim 2 wherein C₆----C₇ is a double bond between the C–6 and C–7 carbon atoms.

5. A pregnano[17,16α-d] - 1',3' - oxathiolane of the formula

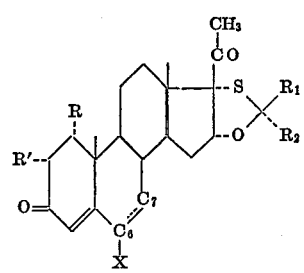

wherein R₁ and R₂ each are hydrogen, alkyl, cycloalkyl, aryl or heteroaryl or, collectively, —(CH₂)ₙ— wherein n is an integer from 2 to 6; R and R' each are hydrogen or, collectively, methylene or a further carbon-carbon bond between the C–1 and C–2 carbon atoms; X is hydrogen, halogen or alkyl, and C₆----C₇ is a single or double bond between the C–6 and C–7 carbon atoms.

6. An acetal of claim 5, of the formula

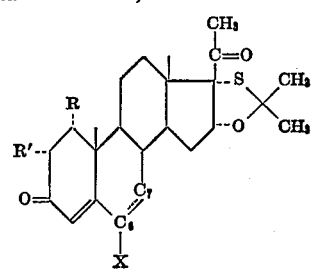

wherein R, R', X and $C_6$---$C_7$ have the values given therein.

7. An acetal of claim 5 of the formula

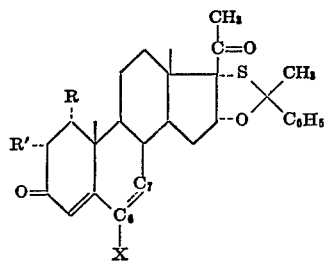

wherein R, R', X and $C_6$---$C_7$ have the values given therein.

8. A compound of claim 5, 2',2'-dimethyl-4-pregneno[17,16α-d]-1',3'-oxathiolane-3,20-dione.
9. A compound of claim 5, (2'R)-2'-methyl-2'-phenyl-4-pregneno[17,16α-d]-1',3'-oxathiolane-3,20-dione.
10. A compound of claim 5, 2',2'-dimethyl-4,6-pregnadieno[17,16α-d]-1',3'-oxathiolane-3,20-dione.
11. A compound of claim 5, 2',2'-dimethyl-1,4,6-pregnatrieno[17,16α-d]-1',3'-oxathiolane-3,20-dione.
12. A compound of claim 5, 2',2'-dimethyl-1α,2α-methylene-4,6-pregnadieno[17,16α - d]-1',3'-oxathiolane-3,20-dione.
13. A compound of claim 5, 6-chloro-2',2'-dimethyl-4,6-pregnadieno[17,16α-d]-1',3'-oxathiolane-3,20-dione.
14. A compound of claim 5, 6-chloro-2',2'-dimethyl-1,4,6-pregnatrieno[17,16α - d] - 1',3' - oxathiolane-3,20-dione.
15. A compound of claim 5, 6-chloro-2',2'-dimethyl-1α,2α-methylene - 4,6 - pregnadieno[17,16α-d]-1',3'-oxathiolane-3,20-dione.
16. A compound of claim 1, 16β-hydroxy-17-mercapto-4-pregnene-3,20-dione.
17. A compound of claim 1, 6-chloro-16β-hydroxy-17-mercapto-4,6-pregnadiene-3,20-dione.

18. A process for the production of pregnano-[17,16α-d]-1',3'-oxathiolane acetals of claim 5 which comprises condensing, in the presence of an acidic catalyst, a 16β-hydroxy-17α-mercapto-pregnane of the formula

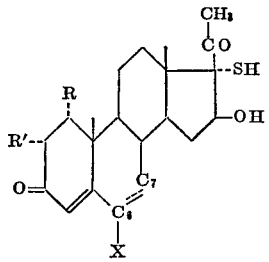

with an aldehyde or ketone of the formula

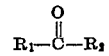

wherein, in each instance, $R_1$ and $R_2$ each are hydrogen, alkyl, cycloalkyl, aryl or heteroaryl or, collectively, —$(CH_2)_n$— wherein $n$ is an integer from 2 to 6; R and R' each are hydrogen or, collectively, methylene or a further carbon-carbon bond between the C-1 and C-2 carbon atoms; X is hydrogen, halogen or alkyl, and $C_6$---$C_7$ is a single or double bond between the C-6 and C-7 carbon atoms.

19. A process according to claim 18 wherein $R_1$ is $CH_3$.
20. A process according to claim 19 wherein $R_2$ is $CH_3$.
21. A process according to claim 19 wherein $R_2$ is phenyl.

References Cited
UNITED STATES PATENTS
3,170,920   2/1965   Komeno _____ 260—239.55

HENRY A. FRENCH, Primary Examiner

U.S. Cl. X.R.
260—239.55 R, 397.4, 999

UNITED STATES PATENT OFFICE
CERTIFICATE OF CORRECTION

Patent No. 3,770,726　　　　　　　　Dated November 6, 1973

Inventor(s) Helmut Hofmeister, et al.

It is certified that error appears in the above-identified patent and that said Letters Patent are hereby corrected as shown below:

IN THE HEADING, UNDER "FOREIGN APPLICATION PRIORITY DATA", insert the following:

-- March 17, 1971 ..............Germany P 21 13 530.8 --

Signed and sealed this 16th day of April 1974.

(SEAL)
Attest:

EDWARD M. FLETCHER, JR.　　　　　　C. MARSHALL DANN
Attesting Officer　　　　　　　　　　Commissioner of Patents